US011335108B2

(12) United States Patent
Phatak et al.

(10) Patent No.: US 11,335,108 B2
(45) Date of Patent: May 17, 2022

(54) SYSTEM AND METHOD TO RECOGNISE CHARACTERS FROM AN IMAGE

(71) Applicant: MARLABS INNOVATIONS PRIVATE LIMITED, Bangalore (IN)

(72) Inventors: Amit Phatak, Pune (IN); Akash Thakur, Patna (IN); Sejal Oroosh, Bengaluru (IN)

(73) Assignee: MARLABS INCORPORATED

( * ) Notice: Subject to any disclaimer, the term of this patent is extended or adjusted under 35 U.S.C. 154(b) by 71 days.

(21) Appl. No.: 17/084,687

(22) Filed: Oct. 30, 2020

(65) Prior Publication Data
US 2022/0044048 A1   Feb. 10, 2022

(30) Foreign Application Priority Data
Aug. 10, 2020   (IN) .............................. 202041034254

(51) Int. Cl.
| | |
|---|---|
| *G06V 30/00* | (2022.01) |
| *G06V 30/148* | (2022.01) |
| *G06K 9/62* | (2022.01) |
| *G06V 10/44* | (2022.01) |

(52) U.S. Cl.
CPC ......... *G06V 30/153* (2022.01); *G06K 9/6264* (2013.01); *G06V 10/443* (2022.01)

(58) Field of Classification Search
CPC .. G06V 30/153; G06V 10/443; G06K 9/6255; G06K 9/66; G06K 9/6216; G06K 9/00228; G06K 9/18; G06K 9/00215; G06K 9/228; G06K 9/4609; G06K 9/48; G06K 9/6423; G06K 9/32; G06K 9/6407; G06K 9/686; G06K 9/40; G06K 19/06037; G06F 17/30249; G06T 7/0083; G06T 7/0081; G06T 7/001; G06T 5/001; G06T 5/40; G06T 5/20; G06T 5/50; G11B 27/28

See application file for complete search history.

(56) References Cited

U.S. PATENT DOCUMENTS

| | | | |
|---|---|---|---|
| 6,035,061 A | 3/2000 | Katsuyama et al. | |
| 8,401,333 B2* | 3/2013 | Miyakawa | ................ G06T 7/33 382/284 |
| 8,995,774 B1 | 3/2015 | van Deventer et al. | |
| 9,582,762 B1* | 2/2017 | Cosic | .................. H04L 12/1831 |

(Continued)

*Primary Examiner* — Amir Alavi
(74) *Attorney, Agent, or Firm* — Jason C. Cameron

(57) ABSTRACT

System and method to recognise characters from an image are disclosed. The method includes receiving the at least one image, pre-processing the at least one image, extracting a plurality of characters from the corresponding at least one image, extracting at least one structure from the corresponding at least one image upon applying an edge detection technique to extract a structure, identifying a template based on extracted structure, subjecting the plurality of characters into a plurality of ensemble AI models to extract one of a plurality of texts, a plurality of non-textual data and a combination thereof, comparing a plurality of extracted plurality of texts, a plurality of non-textual data, or a combination thereof from the corresponding plurality of ensemble AI models with each other, generating a confidence score and validating one of the plurality of accurate texts, the plurality of accurate non-textual data, or a combination thereof.

10 Claims, 5 Drawing Sheets

(56) References Cited

U.S. PATENT DOCUMENTS

| | | | |
|---|---|---|---|
| 9,633,306 B2* | 4/2017 | Liu | G06N 3/084 |
| 10,331,983 B1* | 6/2019 | Yang | G06N 3/063 |
| 10,467,464 B2* | 11/2019 | Chen | G06V 30/412 |
| 10,796,221 B2* | 10/2020 | Zhang | G16H 50/20 |
| 10,848,508 B2* | 11/2020 | Chen | G06N 20/00 |
| 11,055,822 B2* | 7/2021 | Ramanujam | G06F 16/53 |
| 11,082,610 B2* | 8/2021 | Shin | H04N 5/23222 |
| 2003/0169925 A1 | 9/2003 | Polonowski | |
| 2009/0116736 A1 | 5/2009 | Neogi et al. | |
| 2017/0004374 A1 | 1/2017 | Osindero | |
| 2017/0242849 A1* | 8/2017 | Biswas | G06F 16/41 |
| 2019/0114486 A1* | 4/2019 | Wang | H04N 21/44 |
| 2021/0049398 A1* | 2/2021 | Kurita | G06V 10/451 |

* cited by examiner

SYSTEM AND METHOD TO RECOGNISE CHARACTERS FROM AN IMAGE

CROSS-REFERENCE TO RELATED APPLICATION

This Application claims priority from a complete patent application filed in India having Patent Application No. 202041034254, filed on Aug. 10, 2020 and titled "SYSTEM AND METHOD TO RECOGNISE CHARACTERS FROM AN IMAGE"

FIELD OF INVENTION

Embodiments of a present disclosure relate to detection of characters in an image, and more particularly to a system and method to recognise characters from the image using an artificial intelligence (AI) technique.

BACKGROUND

Detection or recognition techniques are applied on the set of images, a scanned document, a scanned photo or the like, in order to extract text and convert the extracted text into machine readable text. Conventionally, a variety of methodologies may be used for extracting information from obtained images. This information may be printed text, hand-printed text, may contain non-textual components like tables, illustrations and graphical representations. In order to convert such text into machine readable format, a conventional system known as an optical character recognition (OCR) systems are used. The OCR system consists of programs to extract many of the aforesaid information from an image and convert them into computer editable and searchable format. However, a document may not only consist of typed and hand-printed texts but handwritten objects as well. The existing dedicated data extraction methods are useful for hand-printed text extraction but are often inefficient and unreliable for extracting handwritten texts. This is the case because the typical optical character recognition methods are not configured for handwritten texts, thus, causing inaccuracies and errors. Also, in document management processes and many aspects of carrying business, one may experience the task of classifying multitudes of identical documents based on their physical structure and business use case.

In addition, in various conventional systems used for text recognition, the software needs to be configured each time a new or an unknown template is presented for recognition. Another kind of problem occurs in manual validation of recognized documents for uncertain values. Also, the entire process involves the assignment of documents to individuals, tracking progress, and maybe a secondary level of review for a few documents. Such limitations increase the human interventions and are prone to errors. Due to the such manual handling the conventional approach becomes slow and time consuming, thereby making such an approach less reliable.

Hence, there is a need for an improved system and method to recognise characters from the image to address the aforementioned issues.

BRIEF DESCRIPTION

In accordance with one embodiment of the disclosure, a system to recognise characters from at least one image is disclosed. The system includes one or more processors. The system also includes an image receiving module configured to receive the at least one image representative of a document. The system also includes a pre-processing module configured to pre-process the at least one image to reduce noise and enhance one or more parameters associated with image quality. The system also includes a feature extraction module configured to extract a plurality of characters from the corresponding at least one image using a character recognition technique. The feature extraction module is also configured to extract at least one structure from the corresponding at least one image upon applying an edge detection technique to extract an X co-ordinate and a Y co-ordinate associated to the corresponding at least one structure, wherein the at least one structure is a representative of the document. The feature extraction module is also configured to identify a template based on at least one extracted structure upon comparing the template with a plurality of pre-stored templates stored in a database. The system also includes a character accuracy detection module configured to subject the plurality of characters into a plurality of ensemble artificial intelligence (AI) models to extract one of a plurality of texts, a plurality of non-textual data and a combination thereof, from a plurality of extracted characters from each of the plurality of ensemble artificial intelligence (AI) models. The character accuracy detection module is also configured to compare a plurality of extracted texts, a plurality of extracted non-textual data, or a combination thereof, from the corresponding plurality of ensemble artificial intelligence (AI) models with each other to generate a plurality of accurate texts, a plurality of accurate non-textual data, or a combination thereof. The character accuracy detection module is also configured to generate a confidence score for each of the plurality of accurate texts, each of the plurality of accurate non-textual data or a combination thereof. The system also includes a character validation module configured to validate one of the plurality of accurate texts, the plurality of accurate non-textual data, or a combination thereof, generated upon comparison based on the confidence score upon receiving insights by a user to recognise the one or more characters from the corresponding at least one image.

In accordance with another embodiment of the disclosure, a method for recognising one or more characters from at least one image is disclosed. The method includes receiving the at least one image representative of a document. The method also includes pre-processing the at least one image for reducing noise and enhancing one or more parameters associated with image quality. The method also includes extracting a plurality of characters from the corresponding at least one image using a character recognition technique. The method also includes extracting at least one structure from the corresponding at least one image upon applying an edge detection technique for extracting an X co-ordinate and a Y co-ordinate associated to the corresponding at least one structure. The method also includes identifying a template based on at least one extracted structure upon comparing the template with a plurality of pre-stored templates stored in a database. The method also includes subjecting the plurality of characters into a plurality of ensemble artificial intelligence (AI) models to extract one of a plurality of texts, a plurality of non-textual data and a combination thereof, from a plurality of extracted characters from each of the plurality of ensemble artificial intelligence (AI) models. The method also includes comparing a plurality of extracted non-textual data, or a combination thereof, from the corresponding plurality of ensemble artificial intelligence (AI) models with each other for generating a plurality of accurate texts, a plurality of accurate non-textual data, or a combination thereof. The method also includes generating a confidence score for each of the plurality of accurate texts, each of the plurality of accurate non-textual data or a combination thereof. The method also includes validating one of the plurality of accurate texts, the plurality of accurate non-textual data, or a combination thereof, generated upon comparison based on the confidence score upon receiving insights by a user to recognise the one or more characters from the corresponding at least one image.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for recognising one or more characters from at least one image. The term 'character' may be defined as a unit of information that roughly corresponds to a grapheme, grapheme-like unit, or symbol, such as in an alphabet, text or syllabary in the written form of a natural language.

Figure 1:
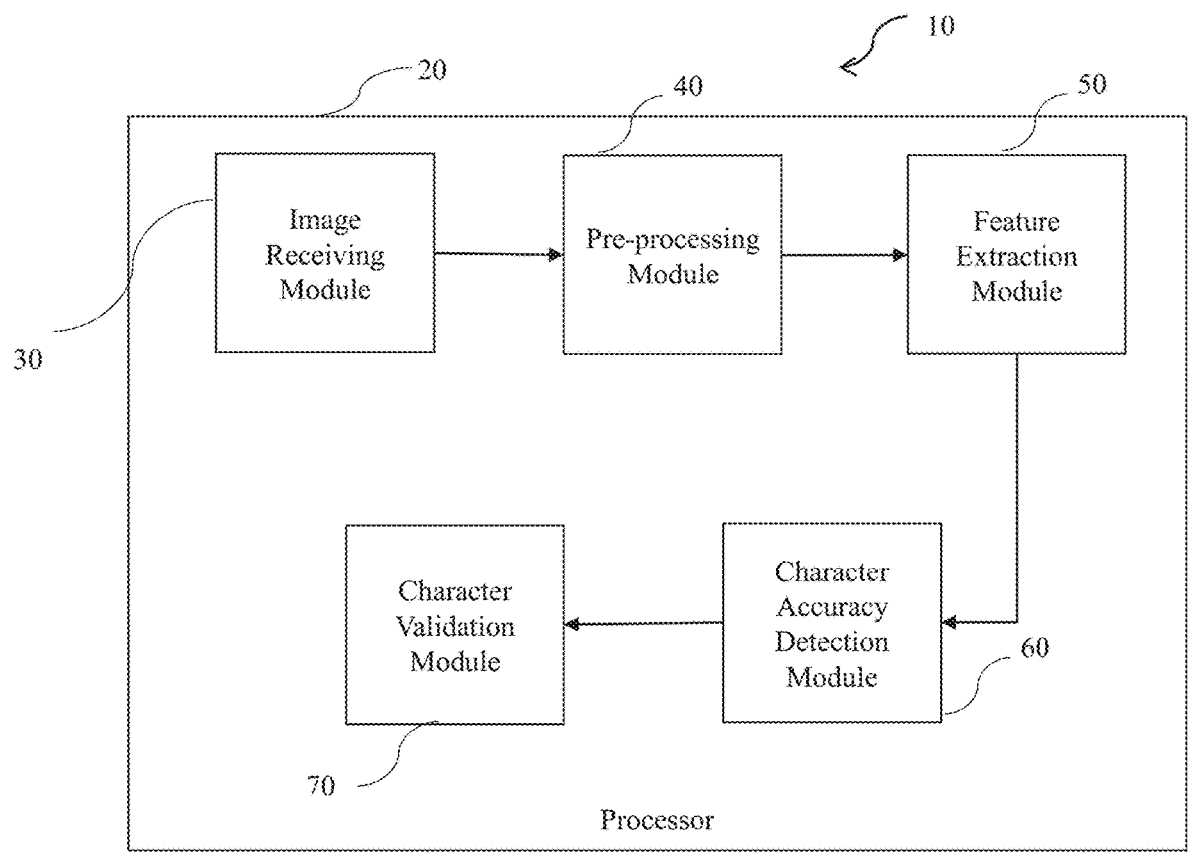
FIG. 1 is a block diagram representation of a system to recognise one or more characters from at least one image in accordance with an embodiment of the present disclosure.

FIG. 1 is a block diagram representation of a system 10 to recognise one or more characters from at least one image in accordance with an embodiment of the present disclosure. The system 10 includes one or more processors 20. The system 10 also includes an image receiving module 30 operable by the one or more processors 20. The image receiving module 30 is configured to receive the at least one image representative of a document. In one embodiment, the at least one image may be received upon scanning the document, taking a picture of the document by an image capturing unit such as a camera, or the like. The document may be in a pre-defined format such as a word format, excel format, Portable Document Format (PDF), or the like. In one exemplary embodiment, data within the document may include handwritten data, hand-printed data, typed text data, images, tables, paragraphs and other textual or non-textual data. In such embodiment, the tables may include multiple rows and multiple columns. In one exemplary embodiment, the data may be structured data or unstructured data.

The system 10 includes a pre-processing module 40 operable by the one or more processors 20. The pre-processing module 40 is configured to pre-process the at least one image to reduce noise and enhance one or more parameters associated with image quality. In one embodiment, the one or more parameters associated with the image quality may include one of de-skewing of the at least one image, parameters associated to gamma value of the at least one image, contract of the at least one image, enhancement of the at least one image, or a combination thereof. More specifically, the at least one image may be subjected to a pre-processing engine to enhance the quality of the corresponding at least one image.

In one specific embodiment, the at least one image may be fed into a first pre-processing engine for de-skew, gamma adjustments, and denoise of the corresponding at least one image. Further, the at least one image from the first pre-processing engine may be fed into a second pre-processing engine based on a format of the document an upon detecting the quality of the at least one image. The second pre-processing engine may be configured to further adjust the quality of the at least one image.

Furthermore, the system 10 includes a feature extraction module 50 operable by the one or more processors 20. The feature extraction module 50 is configured to extract a plurality of characters from the corresponding at least one image using a character recognition technique. In one exemplary embodiment, the plurality of characters may include one of a text, numeric characters, non-numeric characters, special characters or a combination thereof.

In one specific embodiment, the character recognition technique may include one of canny edge detection technique, bilateral filter technique, or a combination thereof. As used herein, the "canny edge detection technique" is defined as a technique which is an edge detector operator that uses a multi-stage algorithm to detect a wide range of edges in images. Also, the term "edges" is defined as Edges are significant local changes in the image and are important features for analyzing images. Edges typically occur on the boundary between two different regions in an image. In such embodiment edge detection is a first step in recovering information from images. Further, the term "bilateral filter technique" is defined as a non-linear, edge-preserving, and noise-reducing smoothing filter applied on images.

The feature extraction module 50 is also configured to extract at least one structure from the corresponding at least one image upon applying the edge detection technique to extract an X co-ordinate and a Y co-ordinate associated to the corresponding at least one structure of the at least one image. The at least one structure is a representative of the document. More specifically, the X co-ordinate and the Y co-ordinate of the structure of the document is extracted upon applying the edge detection technique. In one embodiment, the structure of the document may also correspond to the format of the document.

The feature extraction module 50 is also configured to identify a template based on at least one extracted structure upon comparing the template with a plurality of pre-stored templates stored in a database. In one embodiment, multiple temples may be stored in the database as the pre-stored templates. On extracting the structure of the document from the at least one image, the same is compared with the pre-stored templates. In a situation, if the extracted template matches with the pre-stored templates, the analysis is further continued by the system. In another situation, if the extracted template is not found among the pre-stored templates, the feature extraction module 50 will generate a notification to store the said extracted template within the database for further usages.

The system 10 further includes a character accuracy detection module 60 operable by the one or more processors 20. The character accuracy detection module 60 is configured to subject the plurality of characters into a plurality of ensemble artificial intelligence (AI) models to extract one of a plurality of texts, a plurality of non-textual data and a combination thereof, from a plurality of extracted characters from each of the plurality of ensemble artificial intelligence AI models. As used herein, the term "ensemble AI model" or an ensemble (AI) technique is defined as an artificial intelligence technique which includes a process of running two or more related but different analytical models and then synthesizing the results into a single score or spread in order to improve the accuracy of predictive analytics. Also, the term "artificial intelligence technique" is defined as is intelligence demonstrated by machines, unlike the natural intelligence displayed by humans and animals.

In operation, the plurality of characters is subjected to each of the plurality of ensemble AI models simultaneously. Further, each of the ensemble AI models extract one of the plurality of texts, the plurality of non-textual data and a combination thereof from the plurality of characters. Further, analysed data from each of the ensemble AI models is collected independently and are subjected to further analysis process.

The character accuracy detection module 60 is further configured to compare a plurality of extracted texts, a plurality of extracted non-textual data, or a combination thereof, from the corresponding plurality of ensemble artificial intelligence (AI) models with each other to generate a plurality of accurate texts, a plurality of accurate non-textual data, or a combination thereof. Referring to the above described operation, the analysed data from each of the ensemble AI models are compared with each other. Upon comparison, if the data analysed by each of the ensemble AI models is same, then the probability of the analysis being right is high. If the data analysed by each of the ensemble AI models varies, then the probability of the analysis being right may be medium or low based on the degree of variations in the analysed data.

Furthermore, the character accuracy detection module 60 is configured to generate a confidence score for each of the plurality of accurate texts, each of the plurality of accurate non-textual data or a combination thereof. In continuation with the above described operation, the confidence score will be generated based on the probability of the analysis of the extracted and analysed data from the plurality of ensemble AI models.

The system 10 also includes a character validation module 70 operable by the one or more processors 20. The character validation module 70 is configured to validate one of the plurality of accurate texts, the plurality of accurate non-textual data, or a combination thereof, generated upon comparison based on the confidence score upon receiving insights by a user to recognise the one or more characters from the corresponding at least one image. In one embodiment, the validation of the plurality of accurate texts or the plurality of accurate non-textual data may be done by an authorized user manually upon choosing the corresponding data and modifying the data accordingly. In such embodiment, as the user selects the data which may be a textual or a non-textual data, a dialog box may appear which may enable the user to modify the text based on the expertise. In some embodiment, the manually updated may include updating for any incomplete, uncertain, missing, or low confidence values and thereby submitted. The system 10 may further include an intuitive interface to compare the original document with reproduced and recognized document for uncomplicated and rapid validation.

In such embodiment, the validated data is employed to map the textual data points to the corresponding structure which may include text in the form of paragraphs and tables. Further, Multiple layers of pattern matching are applied by configuring regex functions. As used herein, the term "regex function" is defined as a string of text that allows you to create patterns that help match, locate, and manage text data.

In one specific embodiment, Machine learning models for clustering such as Density-based spatial clustering of applications with noise (DBSCAN) is applied, which is configured to cluster multitudes of coordinates for mapping information In one exemplary embodiment, the system 10 may further include a representation module operable by the one or more processors 20. The representation module may be configured to configured to represent one of a plurality of validated texts, a plurality of validated non-textual data or a combination thereof in a required format. In one embodiment, the required format may include one of word format, excel format, Portable Document Format (PDF), or the like.

Figure 2:
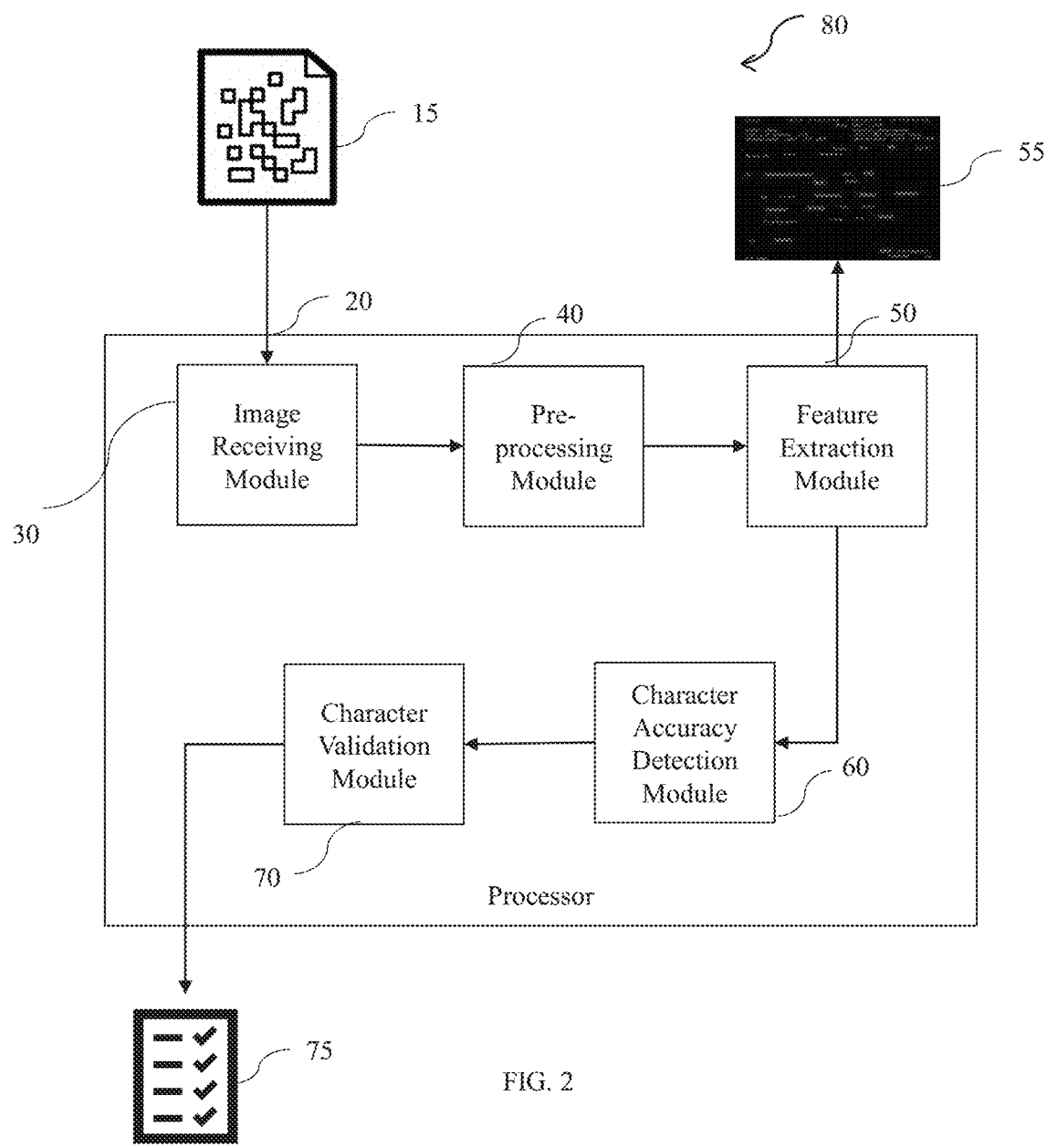
FIG. 2 is a block diagram representation of an exemplary embodiment of the system to recognise one or more characters from a scanned image of FIG. 1 in accordance with an embodiment of the present disclosure.

FIG. 2 is a block diagram representation of an exemplary embodiment of the system 80 to recognise one or more characters from a scanned image of FIG. 1 in accordance with an embodiment of the present disclosure. A medical prescription 15 which is handwritten by a doctor is scanned and is converted in an image 15. The data in the said prescription 15 consists of unstructured data. The image 15 is then transmitted to the image receiving module 30 for further processing of the document from a scanning device. On receiving the image 15, the same is subjected to pre-processing in order to reduce noise and to enhance the quality of the image 15 by the pre-processing module 40. Furthermore, the characters within the prescription 15 and the structure of the prescription written on the prescription is extracted by the feature extraction module 50 upon applying edge detection technique and bilateral filter technique.

Also, the edge detection technique is applied on the image 15 to extract the X co-ordinate and the Y co-ordinate of the extracted structure. Consequently, the template 55 to which the extracted data may belong to is identified. Further, the characters extracted from the image 15 is subjected to the plurality of ensemble AI models to determine and accurately extract the text representative of medicine and medical tests which are handwritten by the doctor on the prescription 15. The extracted texts are compared with one another to generate the right texts as written on the prescription 15. Furthermore, each of the text is generated a confidence score by the character accuracy detection module 60. The result was found that two texts had the least confidence score as the determined text from each of the plurality of ensemble AI models was not same for the two words. Rest of the plurality of extracted texts had a high confidence score as the determined text from each of the plurality of ensemble AI models were same. Furthermore, the two words with less confidence score is validated and corrected by the user through the character validation module 70. Subsequently, the determined texts are placed within the determined structured and are converted to the PDF by the representation module.

Furthermore, the image receiving module 30, the pre-processing module 40, the feature extraction module 50, the character accuracy detection module 60, the character validation module 70 are all operable by the processor 20.

Figure 3:
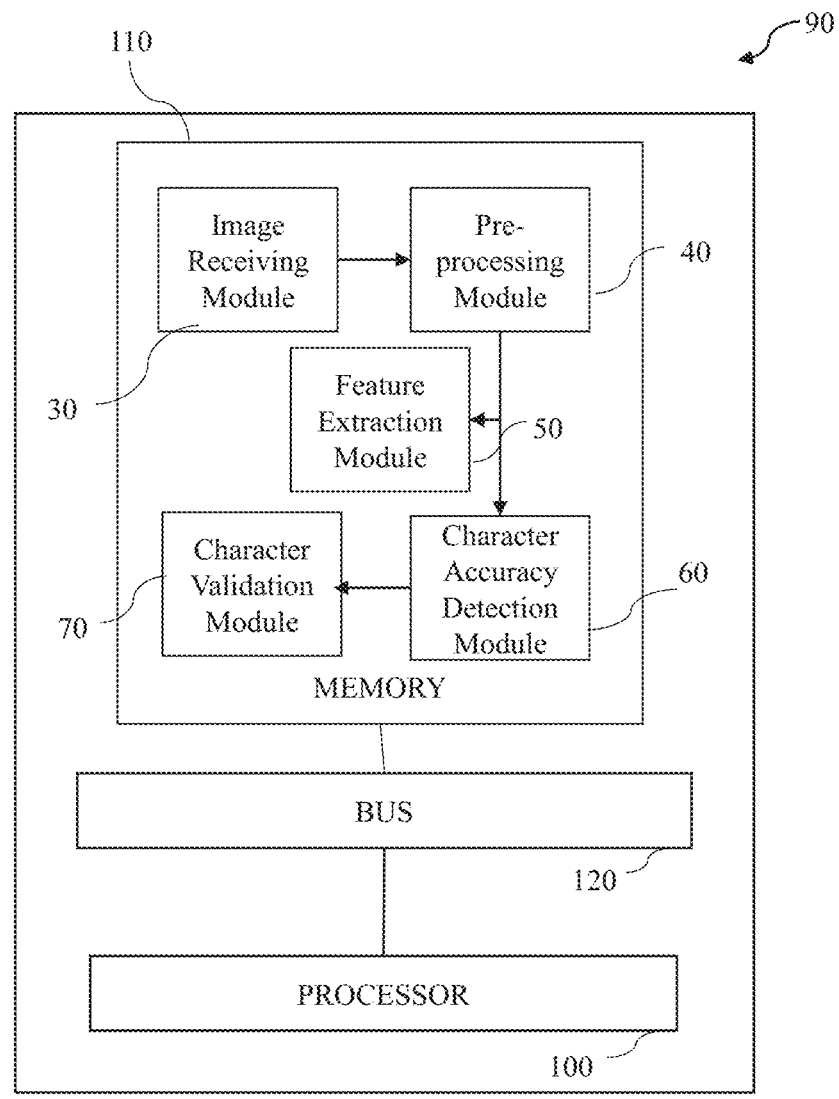
FIG. 3 is a block diagram representation of a processing subsystem located on a local server or on a remote server in accordance with an embodiment of the present disclosure.

FIG. 3 is a block diagram representation of a processing subsystem located on a local server or on a remote server in accordance with an embodiment of the present disclosure. The server 90 includes processor(s) 100, and memory 110 operatively coupled to the bus 120.

The processor(s) 100, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 4A:
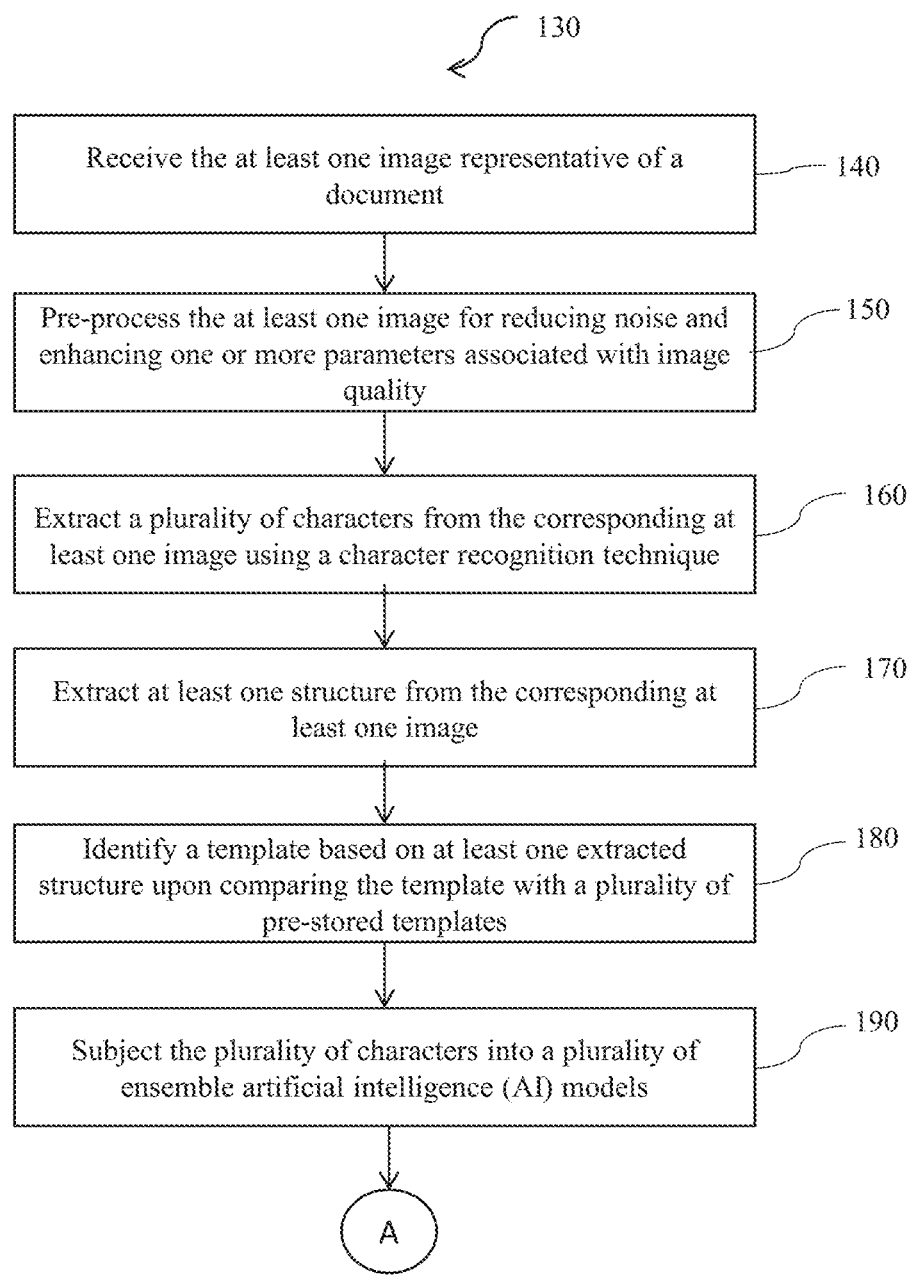
FIG. 4a and FIG. 4b are flow charts representing steps involved in a method for recognising one or more characters from at least one image with an embodiment of the present disclosure.
Figure 4B:
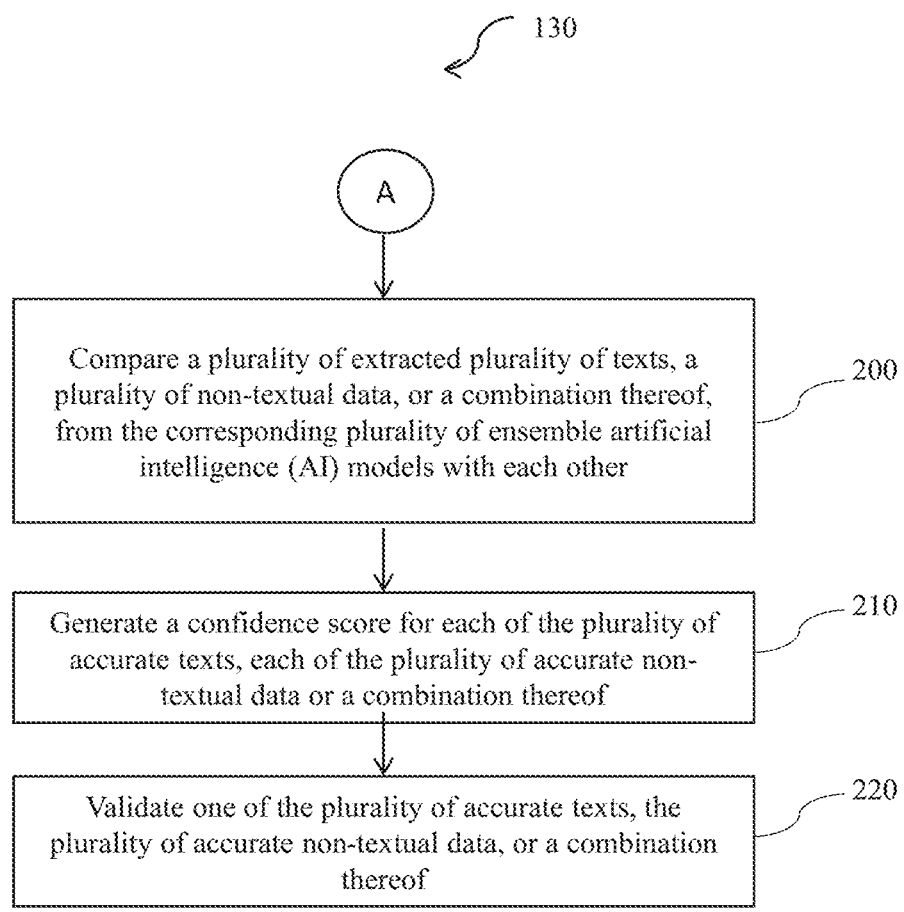

The memory 110 includes a plurality of modules stored in the form of executable program which instructs the processor 100 to perform the method steps illustrated in FIG. 4a and FIG. 4b. The memory 110 is substantially similar to the system 10 of FIG. 1. The memory 110 has the following modules: an image receiving module 30, a pre-processing module 40, a feature extraction module 50, a character accuracy detection module 60 and a character validation module 70.

The image receiving module 30 is configured to receive the at least one image representative of a document. The pre-processing module 40 is configured to pre-process the at least one image to reduce noise and enhance one or more parameters associated with image quality. The feature extraction module 50 is configured to extract a plurality of characters from the corresponding at least one image using a character recognition technique, extract at least one structure from the corresponding at least one image upon applying an edge detection technique to extract an X co-ordinate and a Y co-ordinate associated to the corresponding at least one structure and to identify a template based on at least one extracted structure upon comparing the template with a plurality of pre-stored templates stored in a database.

The character accuracy detection module 60 is configured to subject the plurality of characters into a plurality of ensemble artificial intelligence (AI) models to extract one of a plurality of texts, a plurality of non-textual data and a combination thereof, from a plurality of extracted characters from each of the plurality of ensemble artificial intelligence (AI) models, compare a plurality of extracted texts, a plurality of extracted non-textual data, or a combination thereof, from the corresponding plurality of ensemble artificial intelligence (AI) models with each other to generate a plurality of accurate texts, a plurality of accurate non-textual data, or a combination thereof and to generate a confidence score for each of the plurality of accurate texts, each of the plurality of accurate non-textual data or a combination thereof.

The a character validation module 70 is configured to validate one of the plurality of accurate texts, the plurality of accurate non-textual data, or a combination thereof, generated upon comparison based on the confidence score upon receiving insights by a user to recognise the one or more characters from the corresponding at least one image.

FIG. 4a and FIG. 4b are flow charts representing steps involved in a method 130 for recognising one or more characters from at least one image with an embodiment of the present disclosure. The method 130 includes receiving the at least one image representative of a document in step 140. In one embodiment, receiving the at least one image may include receiving the at least one image from an image receiving module. In one exemplary embodiment, receiving the at least one image may include receiving the at least one image an image receiving module. The document may be in a pre-defined format such as a word format, excel format, Portable Document Format (PDF), or the like.

The method 130 also includes extracting a plurality of characters from the corresponding at least one image using a character recognition technique in step 160. In one embodiment, extracting the plurality of characters may include extracting the plurality of characters by a feature extraction module. In one specific embodiment, extracting the plurality of characters may include extracting one of a text, numeric characters, non-numeric characters, special characters or a combination thereof. In one exemplary embodiment, extracting the plurality of characters may include extracting the plurality of characters using one of canny edge detection technique, bilateral filter technique, or a combination thereof.

The method 130 also includes extracting at least one structure from the corresponding at least one image upon applying an edge detection technique for extracting an X co-ordinate and a Y co-ordinate associated to the corresponding at least one structure in step 170. In one embodiment, extracting the at least one structure from the corresponding at least one image may include extracting the at least one structure by the feature extraction module. In one specific embodiment, extracting the X co-ordinate and the Y co-ordinate may include extracting the X co-ordinate and the Y co-ordinate upon applying the edge detection technique.

The method 130 also includes identifying a template based on at least one extracted structure upon comparing the template with a plurality of pre-stored templates stored in a database in step 180. In one embodiment, identifying the template may include identifying the template by the feature extraction module. In one exemplary embodiment, the method may further include storing the template in the database, if the identified template is not present in the database when the said extracted structure is not found in the database. In such embodiment, storing the template may include storing the template by the feature extraction module.

The method 130 also includes subjecting the plurality of characters into a plurality of ensemble artificial intelligence (AI) models to extract one of a plurality of texts, a plurality of non-textual data and a combination thereof, from a plurality of extracted characters from each of the plurality of ensemble artificial intelligence (AI) models in step 190. In one embodiment, subjecting the plurality of characters into the plurality of ensemble AI models may include subjecting the plurality of characters by a character accuracy detection module.

The method 130 also includes comparing a plurality of extracted non-textual data, or a combination thereof, from the corresponding plurality of ensemble artificial intelligence (AI) models with each other for generating a plurality of accurate texts, a plurality of accurate non-textual data, or a combination thereof in step 200. In one embodiment, comparing the plurality of extracted data may include comparing the plurality of extracted data by the character accuracy detection module.

The method 130 also includes generating a confidence score for each of the plurality of accurate texts, each of the plurality of accurate non-textual data or a combination thereof in step 210. In one embodiment, generating the confidence score may include generating the confidence score by the character accuracy detection module.

The method 130 also includes validating one of the plurality of accurate texts, the plurality of accurate non-textual data, or a combination thereof, generated upon comparison based on the confidence score upon receiving insights by a user to recognise the one or more characters from the corresponding at least one image in step 220. In one embodiment, validating one of the plurality of accurate texts, the plurality of accurate non-textual data, or a combination thereof may include validating one of the plurality of accurate texts, the plurality of accurate non-textual data, or a combination thereof by a character validation module.

In one exemplary embodiment, the method may further include representing one of a plurality of validated texts, a plurality of validated non-textual data or a combination thereof in a required format. In such embodiments, representing one of the plurality of validated texts, the plurality of validated non-textual data or a combination thereof may include representing validated texts, a plurality of validated non-textual data or a combination thereof by a representation module.

Various embodiments of the present disclosure enable the system to have a greater accuracy for handwritten, hand-printed and typed texts, thereby making the system more reliable and more efficient. The system also provides customized extraction for priority information based on users' requirement, utilizing the coordinate system for location identification, thereby eliminating the redundant information from the extracted document. The system also provides automated template classification and recognition for a completely new and unknown template, hence accelerating the process of document digitization and management.

In addition, the system provides an advanced workflow management to streamline document handling for rapid processing. It also includes an automated distributed review system for custom assignment of documents to users for manual review and track progress based on expert rules, thus radically improving the performance at scale. Furthermore, the system provides an intuitive interface to compare the original document with reproduced and recognized document for uncomplicated and rapid validation along with a simplified method for analyzing recognized texts based on the confidence score generated for each text in the recognition system. This enables the user with a prompt and easy review of processed documents.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system to recognise one or more characters from at least one image comprising:
   one or more processors;
   an image receiving module operable by the one or more processors, and configured to receive the at least one image representative of a document;
   a pre-processing module operable by the one or more processors, and configured to pre-process the at least one image to reduce noise and enhance one or more parameters associated with image quality;
   a feature extraction module operable by the one or more processors, and configured to:
      extract a plurality of characters from the corresponding at least one image using a character recognition technique;
      extract at least one structure from the corresponding at least one image upon applying an edge detection technique to extract an X co-ordinate and a Y co-ordinate associated to the corresponding at least one structure, wherein the at least one structure is a representative of the document; and
      identify a template based on at least one extracted structure upon comparing the template with a plurality of pre-stored templates stored in a database;

a character accuracy detection module operable by the one or more processors, and configured to:
  subject the plurality of characters into a plurality of ensemble artificial intelligence (AI) models to extract one of a plurality of texts, a plurality of non-textual data and a combination thereof, from a plurality of extracted characters from each of the plurality of ensemble artificial intelligence (AI) models;
  compare a plurality of extracted texts, a plurality of extracted non-textual data, or a combination thereof, from the corresponding plurality of ensemble artificial intelligence (AI) models with each other to generate a plurality of accurate texts, a plurality of accurate non-textual data, or a combination thereof; and
  generate a confidence score for each of the plurality of accurate texts, each of the plurality of accurate non-textual data or a combination thereof; and
a character validation module operable by the one or more processors, and configured to validate one of the plurality of accurate texts, the plurality of accurate non-textual data, or a combination thereof, generated upon comparison based on the confidence score upon receiving insights by a user to recognise the one or more characters from the corresponding at least one image.

2. The system as claimed in claim 1, wherein the parameters associated to image quality comprises to one of de-skewing of the at least one image, parameters associated to gamma value of the at least one image, contract of the at least one image, enhancement of the at least one image, or a combination thereof.

3. The system as claimed in claim 1, wherein the plurality of characters comprises one of a text, numeric characters, non-numeric characters, special characters or a combination thereof.

4. The system as claimed in claim 1, wherein the feature extraction module is configured to store the template in the database, if the identified template is not present in the database.

5. The system as claimed in claim 1, comprising a representation module operable by the one or more processors, and configured to represent one of a plurality of validated texts, a plurality of validated non-textual data or a combination thereof in a required format.

6. A method for recognising one or more characters from at least one image comprising:
  receiving, by an image receiving module, the at least one image representative of a document;
  pre-processing, by a pre-processing module, the at least one image for reducing noise and enhancing one or more parameters associated with image quality;
  extracting, by a feature extraction module, a plurality of characters from the corresponding at least one image using a character recognition technique;
  extracting, by the feature extraction module, at least one structure from the corresponding at least one image upon applying an edge detection technique for extracting an X co-ordinate and a Y co-ordinate associated to the corresponding at least one structure;
  identifying, by the feature extraction module, a template based on at least one extracted structure upon comparing the template with a plurality of pre-stored templates stored in a database;
  subjecting, by a character accuracy detection module, the plurality of characters into a plurality of ensemble artificial intelligence (AI) models to extract one of a plurality of texts, a plurality of non-textual data and a combination thereof, from a plurality of extracted characters from each of the plurality of ensemble artificial intelligence (AI) models;
  comparing, by the character accuracy detection module, a plurality of extracted plurality of texts, a plurality of non-textual data, or a combination thereof, from the corresponding plurality of ensemble artificial intelligence (AI) models with each other for generating a plurality of accurate texts, a plurality of accurate non-textual data, or a combination thereof;
  generating, by the character accuracy detection module, a confidence score for each of the plurality of accurate texts, each of the plurality of accurate non-textual data or a combination thereof; and
  validating, by a character validation module, one of the plurality of accurate texts, the plurality of accurate non-textual data, or a combination thereof, generated upon comparison based on the confidence score upon receiving insights by a user to recognise the one or more characters from the corresponding at least one image.

7. The method as claimed in claim 6, wherein pre-processing the at least one image for reducing noise and enhance one or more parameters associated with image quality comprises pre-processing the at least one image for one of de-skewing of the at least one image, parameters associated to gamma value of the at least one image, contract of the at least one image, enhancement of the at least one image, or a combination thereof associated with the at least one image.

8. The method as claimed in claim 6, wherein extracting the plurality of characters from the corresponding at least one image comprises extracting one of a text, numeric characters, non-numeric characters, special characters or a combination thereof from the corresponding at least one image.

9. The method as claimed in claim 6, comprising storing, by the feature extraction module, the template in the database, if the identified template is not present in the database.

10. The method as claimed in claim 6, comprising representing, by a representation module, one of a plurality of validated texts, a plurality of validated non-textual data or a combination thereof in a required format.

* * * * *